United States Patent Office 3,093,212
Patented June 11, 1963

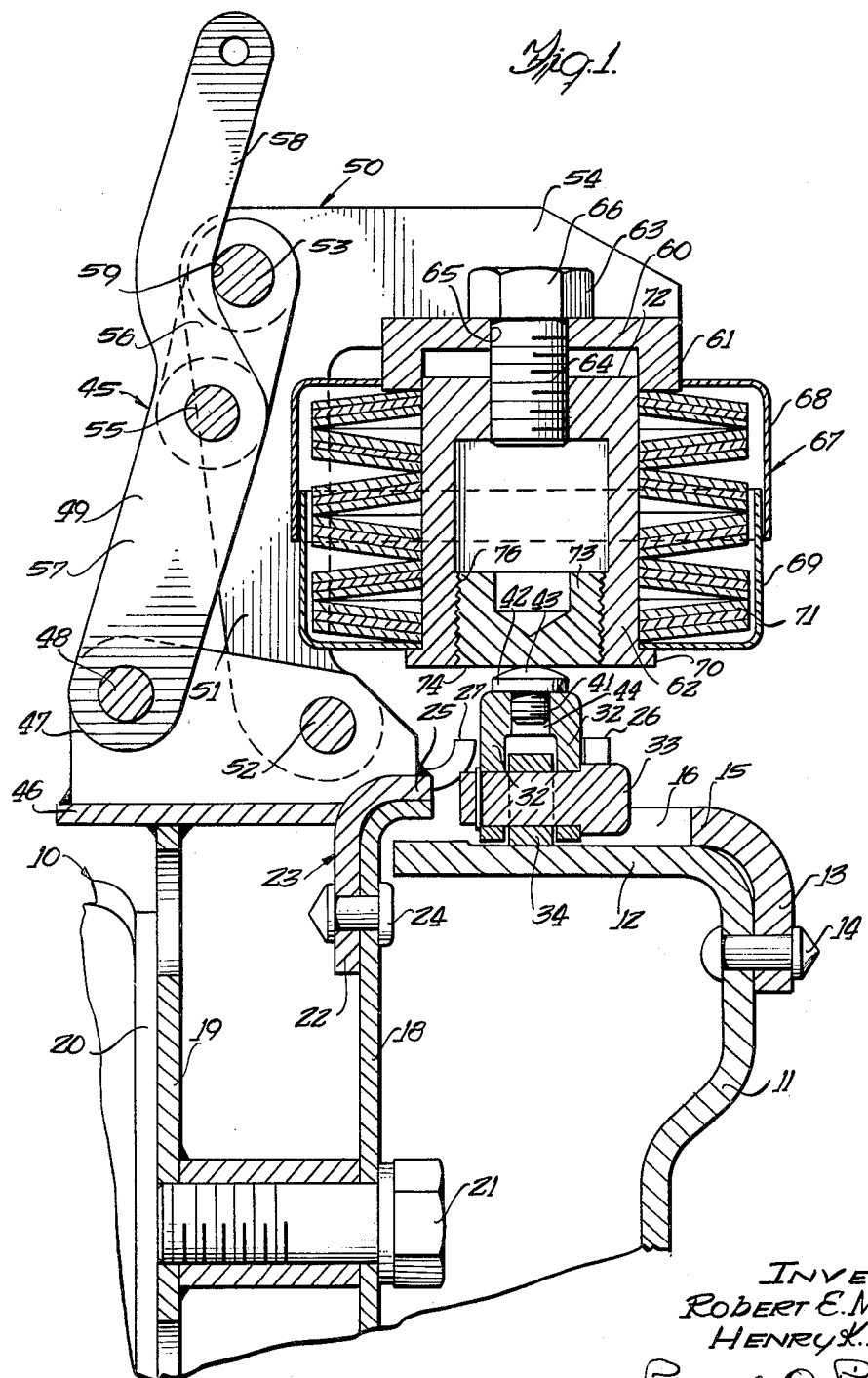

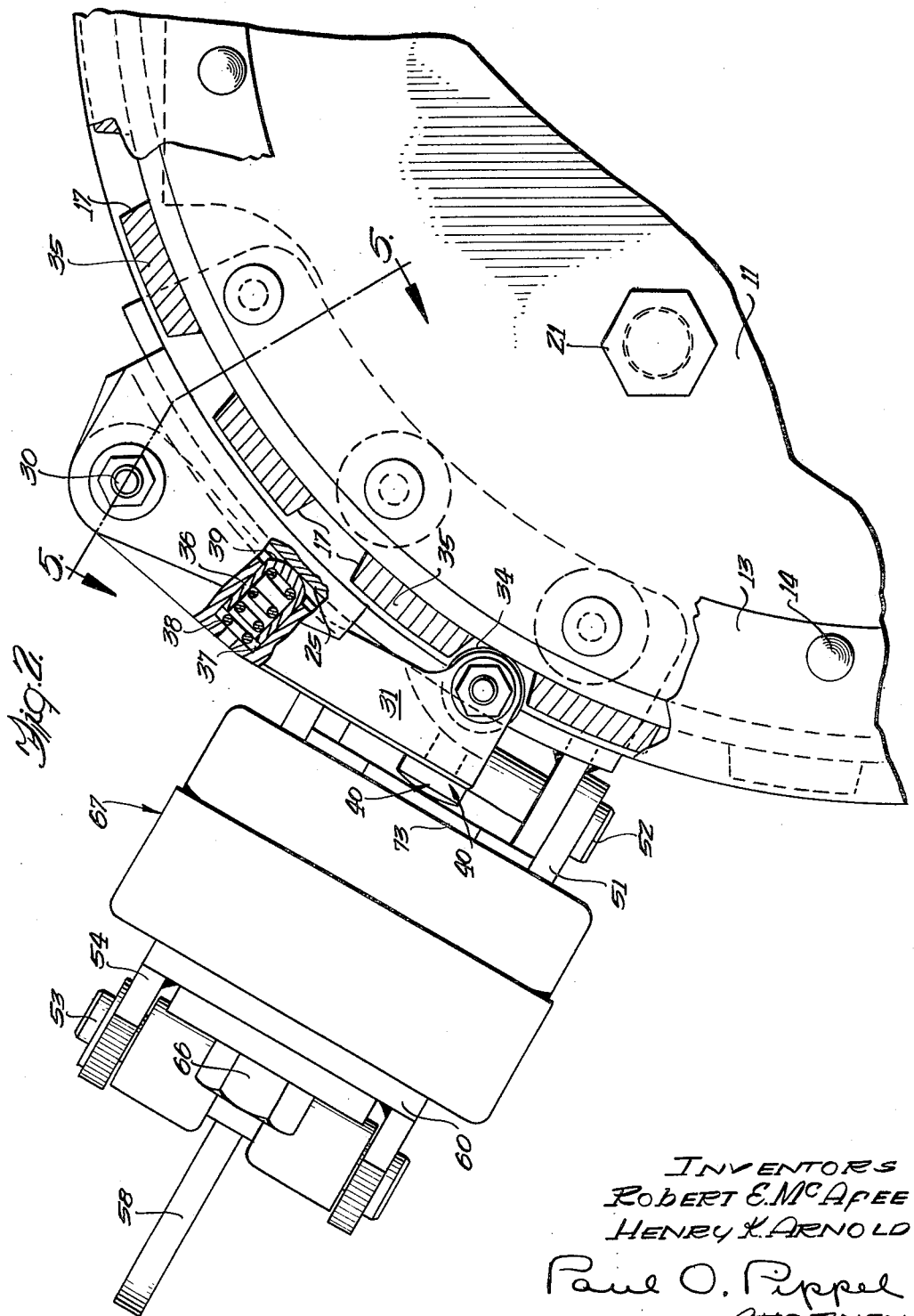

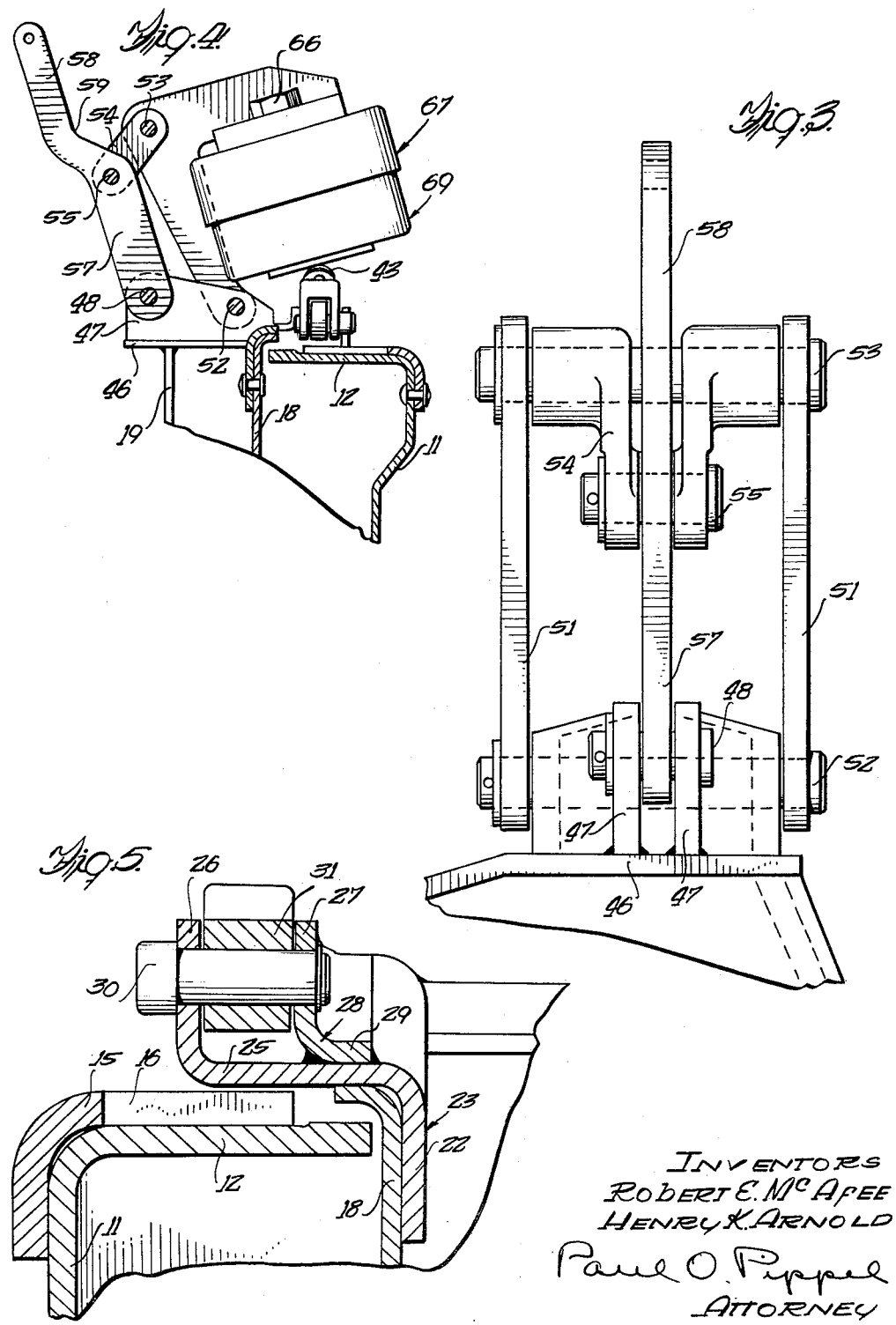

3,093,212
MOTOR VEHICLE LOCK DEVICE
Robert E. McAfee and Henry K. Arnold, Fort Wayne, Ind., assignors to International Harvester Company, Chicago, Ill., a corporation of New Jersey
Filed Sept. 6, 1960, Ser. No. 54,280
18 Claims. (Cl. 188—69)

This invention relates to a motor vehicle parking lock or brake device and more particularly to an improved releasable lock device for positively engaging the propeller or drive shaft of the motor vehicle to prevent accidental forward and rearward motion of the vehicle when parked.

It has become a common practice to provide a positive type as distinguished from a friction type releasable lock device for a motor vehicle equipped with an automatic or semi-automatic transmission which is conditionable to prevent accidental movement of the vehicle when left unattended. While the primary function of a releasable lock device of the type to which the present invention relates is to restrain vehicle movement when the vehicle is parked and left unattended it must be readily engageable and disengageable under all conditions in order to be efficient. It is therefore a primary objective of the present invention to provide a positive type releasable lock device for a motor vehicle which requires very little effort on the part of the vehicle operator to operate.

A still further object is the provision of a unique toggle mechanism for moving a locking pawl or dog into and out of engagement with a tooth member carried by the vehicle propeller shaft.

Another object is the provision of means to guard against the possibility of the locking dogs from being disengaged when the propeller shaft is subjected to a force tending to rotate the same as occurs when the vehicle is parked on a hill or the like.

A still further object is the provision of an improved yieldable or resilient means, under control of the vehicle operator, for urging the lock pawl into engagement with the output or drive shaft gear teeth regardless of whether the pawl is in registration with the teeth of the gear or not in order to prevent the operator from forcefully jamming and breaking the various parts of the pawl when it is not in registration with the space between a pair of adjacent gear teeth.

A further object is the provision of an anti-friction roller carried by the pawl which is engageable with the toothed member fixed to the propeller shaft whereby the pawl may be readily moved out of engagement with the toothed member with very little effort on the part of the vehicle operator even though the vehicle is parked on an incline extending either forwardly or rearwardly and the propeller shaft is under load which tends to bind or retain the pawl in engagement with the toothed member.

Still another object is the provision of adjustable means for varying the magnitude of the yieldable force maintaining the pawl in locking engagement with the toothed member and the operating lever in a position corresponding to the pawl-engaged position.

The foregoing and other important objects and desirable features inherent in and encompassed by the invention together with many of the purposes and uses thereof will become readily apparent from a reading of the ensuing description in conjunction with the annexed drawings, in which:

FIGURE 1 is a longitudinal vertical sectional view of a positive type releasable locking device embodying the invention mounted on the rearwardmost end of a motor vehicle transmission housing;

FIGURE 2 is an end elevational view of the releasable locking device illustrated in FIGURE 1, a portion of the structure is broken away to better illustrate the invention;

FIGURE 3 is an enlarged end elevational view of the toggle mechanism for controlling the operation of the locking pawl;

FIGURE 4 is a view similar to FIGURE 1 with the exception that the locking device is illustrated in its disengaged or released condition; and FIGURE 5 is a sectional view taken substantially along line 5—5 of FIGURE 2.

Referring to the drawings in detail wherein like reference characters represent like elements throughout the various views, the end portion of a transmission casing 10 is partially shown. A drive or propeller shaft, not shown, extends rearwardly from the transmission casing 10 and is operatively connected to the vehicle drive wheels in a conventional manner. The propeller shaft is adapted to rotate whenever the vehicle is in motion. In the present invention a drum 11 is rigidly keyed or otherwise suitably secured to the propeller shaft. The drum 11 has an axially extending cylindrical portion 12 on its outer periphery. A ring-like member 13 is rigidly secured to the drum 11 by means of a plurality of rivets 14 (one of which is shown in FIGURE 1). The ring-like member 13 has a cylindrical portion 15 which overlaps the cylindrical portion 12 of the drum 11. The cylindrical portion 15 of the ring-like member 15 is provided with a plurality of circumferentially spaced axially extending slots therethrough. The surfaces 17 defining the axially extending sides of each slot 17 converge as they extend radially inwardly as best shown in FIGURE 2. The purpose of inclining the side surfaces 17 of the slots 16 will be pointed out hereinafter.

A supporting structure including a pair of axially spaced and parallel plates 18, 19 are rigidly connected to the end wall 20 of the transmission casing 10 by means of a plurality of bolts 21, one of which is shown in FIGURE 1. One leg 22 of a substantially L-shaped bracket 23 is rigidly secured to an outer peripheral edge portion of the supporting plate 18 by means of rivets 24 or the like. The other leg 25 of the bracket 23 extends axially rearwardly and is radially spaced outwardly from the cylindrical portion 15 of the ring-like member 13. As best shown in FIGURE 2 a radially extending tab 26 is integrally formed with a portion of the bracket leg 25. The integrally formed tab 26 is axially spaced and parallel to a leg 27 of a substantially L-shaped member 28 which has its other leg 29 rigidly secured as by welding or the like to the radially outermost surface of the leg 25 of bracket 23. The tab 26 and leg 29 carry an axially extending pivot pin 30. One end of a locking pawl 31 is journalled on the pivot pin 30.

The end of the locking pawl 31 opposite the end connected to the pivot pin 30 is grooved to provide a pair of parallel arms 32 which carry a cylindrical bearing 33. A cylindrical roller 34 disposed between the arms 32 is rotatably supported on the bearing 33. The locking pawl 31 is adapted to pivot about the longitudinal axis of pivot pin 30 to cause the roller 34 to be moved into and out of a position wherein it is disposed within a slot 16 and engages the cylindrical portion 12 of the drum 11 illustrated in FIGURE 2.

From the foregoing it will be appreciated that when the roller 34 is disposed within a respective slot 16 between a pair of adjacent teeth 35 partially defining the slot and is maintained in meshing engagement with the teeth the drum 11 is incapable of rotating with respect to the transmission casing 10.

Resilient means are provided for yieldably urging the pawl 31 in a direction to effect disengagement of the roller 34 with the teeth 35 of the ring-like member 13 and includes a cylindrical plug 36 which is slidably mounted in a recess 37 formed in the locking pawl 31 intermediate the ends thereof. The plug 36 has a central cylindrical cavity extending from one end thereof and a helically-wound compression spring 38 is adapted to have one end bear against the surface defining the bottom of the cavity and its opposite end seated on the surface of the pawl defining the bottom of the recess 37. The plug 36 has a semi-spherical end 39 which is resiliently urged by the spring 38 into engagement with the outermost surface of the bracket leg 25. From the foregoing it will be appreciated that the locking pawl 31 is continually urged in a clockwise direction about the axis of pivot pin 30 as viewed in FIGURE 2. It is to be understood that when the spring 38 approaches its fully expanded condition as illustrated in FIGURE 4 the roller is out of meshing engagement with the teeth 35 of the ring-like member 13 and is disposed radially outwardly of a circle containing the radially outermost surfaces of the teeth 35. The locking pawl 31 also carries a wear button 40 which has a threaded shank portion 41 and an enlarged head 42 provided with a semi-spherical surface 43. The shank portion 41 is adapted to be threaded in a threaded aperture 44 formed in the locking pawl 31. The longitudinal axis of the threaded aperture 44 intersects the longitudinal axis of the bearing 33 substantially at a right angle. From the foregoing it will be appreciated that the wear button 44 may be readily replaced in the event the same should become unduly worn or damaged in use without the necessity of replacing the entire locking pawl 31.

The means for moving the locking pawl 31 into meshing engagement with the ring-like member 13 and for maintaining the roller 34 in locking engagement with the teeth 35 includes a toggle mechanism designated generally by numeral 45. The toggle mechanism 45 includes a supporting plate 46 which is rigidly secured to the plates 18 and 19 as by welding or the like. Rigidly secured to the supporting plate 46 are a pair of spaced brackets 47. The brackets 47 carry a pivot pin 48. One end of a lever 49 is disposed between the brackets 47 and is journalled on the pivot pin 48. The toggle mechanism 45 also includes a pair of bellcranks 50 each of which has an end portion of one arm 51 pivotally connected to the brackets 47 by means of a pivot pin 52 extending parallel to and spaced from the pivot pin 48. An elongated pin 53 having its longitudinal axis parallel to the longitudinal axes of the pivot pins 48 and 52 extends between the bellcranks 50 as shown in FIGURE 3. The pin 53 provides a pivotal support for a pair of arms 54 which extend radially with respect to the longitudinal axis of the pin 53. Pivot connecting means in the form of a pivot pin 55 is utilized to interconnect the free end of each arm 54 and a portion of the lever 49 intermediate the ends thereof. Referring to FIGURE 1 it will be noted that the lever 49 is formed with an intermediate offset section 56 whereby the longitudinal axes of the end sections 57, 58 are spaced in parallel with respect to each other. It will also be noted that the curved edge 59 of the lever 49 partially defining the juncture of the offset section 56 and the end section 58 is adapted to engage the elongated pin 53 to limit pivotal movement of the lever in one direction. It will also be noted that the longitudinal axis of the pivot pin 55 crosses a plane containing the longitudinal axes of the elongated pin 53 and the pivot pin 48 as the lever 49 is rocked between the positions shown in FIGURES 1 and 4.

Extending between and rigidly connected to the arms 54 of bellcranks 50 is a plate 60. An annular flange 61 integrally formed with the plate 60 projects from a mid-portion of the plate 60. The annular flange 61 serves as guide means for slidably receiving one end of a cylindrical member 62. The cylindrical member 62 is operatively connected to the plate 60 by means of a bolt 63 which has its threaded shank portion 64 extending loosely through an aperture 65 formed through the plate 60 and into threading engagement with a threaded recess provided in the uppermost end, as viewed in FIGURE 1, of the cylindrical member 62. The enlarged head 66 of the bolt 63 is adapted to engage the plate 60 to limit sliding movement of the cylindrical member 62 in one direction. A spring housing 67 is provided which is in the form of a pair of cup-shaped elements 68, 69. The closed end of each cup-shaped element 68, 69 is provided with a circular opening therethrough through which the cylindrical member 62 is adapted to extend. The annular portion of the closed end of cup-shaped member 69 is adapted to bear against a radially extending annular flange 70 integrally formed on the lowermost end of the cylindrical member 62, as viewed in FIGURE 1. The annular portion of the closed end of the cup-shaped element 68 encircling the opening therethrough is adapted to bear against the lowermost marginal edge of the annular flange 61 and the opened ends of the cup-shaped elements 68, 69 slidingly engage each other as illustrated in FIGURE 1. A bank of "Belleville" type spring washers or springs 71 are enclosed by the spring housing 67 and are adapted to resiliently urge the cylindrical member 62 axially along the longitudinal axis of the bolt 63 away from the plate 60. It will be noted that the bank of springs 71 resiliently urge the enlarged head 66 of bolt 63 into abutting engagement with the plate 60 and when this condition exists, the end 72 of the cylindrical member 62 opposite the flange 70 is axially spaced from the underside of the plate 60. The purpose of providing clearance between the cylindrical member 62 and the plate 60 will be pointed out hereinafter. From the foregoing it will be appreciated that the cylindrical member 62 is capable for moving axially with respect to the plate 60 a distance equal to the axial spacing between the underside of the plate 60 and the end 72 of the cylindrical member 62 when the enlarged head 66 is abutting the plate 60.

Adjustable means are provided for varying the effective length of the cylindrical member 62. The adjustable means includes a plug 73 which has a flat face 74 adapted to engage the semi-spherical surface 43 of the wear button 40. The plug 73 has exterior screw threads 75 formed thereon which are cooperable with the threads of an axially extending centrally located threaded recess 76 formed in the lowermost end of the cylindrical member 62, as viewed in FIGURE 1. It will be appreciated that by rotating the plug 73 with respect to the cylindrical member 62 in one direction the axial spacing between the flat face 74 of the plug and the end surface 72 of the cylindrical member 62 will be increased and, conversely, when the plug 73 is rotated in the opposite direction the axial spacing between the flat face 74 and the end surface 72 of the cylindrical member 62 will be decreased.

The actuating linkage for rocking the lever 49 to move the pawl roller 34 into engagement with the gear teeth 35 of the ring-like member 13 and to permit disengagement of the pawl roller 34 from the ring-like member 13 is not shown. It is to be understood, however, that such linkage includes a transmission shift control lever disposed contiguous to the vehicle steering wheel and the same operating linkage is used to manually control the operation of the transmission. Thus movement of the shift control lever to a particular position generally designated as a "park" position effects movement of the lever 49 to the position illustrated in FIGURE 1 and, conversely, whenever the shift control levtr is in any other selected position to establish different gear ratios in the transmission the lever 49 is in the position illustrated in FIGURE 4. Thus assuming that the vehicle has just come to rest the lever 49 will be in the position shown in FIGURE 4 and the flat face 74 of the plug 73 will be in engagement with the semi-spherical surface 43 of the wear button 40. The bank of springs 71 will be expanded as will the pawl disengaging spring 38. As stated hereinbefore the resilient action of the bank of springs 71 causes the underside of the enlarged head 66 to be pressed firmly into engagement with the uppermost surface of the plate 60 and the resilient action of the spring 38 causes the locking pawl 31 to be swung about the longitudinal axis of pivot pin 30 in a direction to position the pawl roller 34 radially outwardly of a circle containing radially outermost edges of the teeth 35 of the ring-like member 13. It will be appreciated that the resilient action of the spring 38 tends to rotate the bellcranks 50 in a counterclockwise direction about the longitudinal axis of the pivot pin 52 and the lever 49 in a counterclockwise direction about the longitudinal axis of pivot pin 48, as viewed in FIGURE 4. Now as the lever 49 is rocked in a clockwise direction, as viewed in FIGURE 4, the bellcranks 50 will also rock in a clockwise direction causing the locking pawl 31 to be pivoted in a direction to effect commencement of movement of the pawl roller 34 radially toward the ring-like member 13. It will be appreciated that to effect such movement of the locking pawl 31 requires compressing the pawl disengaging spring 38 which is of considerably lighter construction than the bank of springs 71. Continued rocking of the lever 49 in a clockwise direction causes the pawl roller 34 to be lowered into meshing engagement with the teeth 35 on the ring-like member 13 by being pivoted about pivot pin 30 to thereby positively lock the propeller shaft against rotation and consequently prevent accidental or other movement of the vehicle once it has assumed its gear-engaging position. When the pawl roller 34 is in its gear-engaging position the curved edge 59, partially defining the offset section 56 of the lever 49, engages a central portion of the elongated pin 53 as shown in FIGURE 1 to limit rocking movement of the lever 49 in a clockwise direction. It will be appreciated that pivotal movement of the bellcranks 50 from the position shown in FIGURE 4 to the position shown in FIGURE 1 is yieldably resisted by the pawl disengaging spring 38. In other words a biasing force continually tends to rotate the bellcranks 50 in a counterclockwise direction as viewed in FIGURE 1 about the longitudinal axis of pivot pin 52. Consequently a counter force must be applied to the lever 49 to overcome such resilient force in order to lock the lever clockwise from the position shown in FIGURE 4 toward the position shown in FIGURE 1. However, as soon as the longitudinal axis of the pivot pin 52 crosses a plane containing the longitudinal axes of the pivot pin 45 and the elongated pin 53, the resilient force applied to the bellcranks 50 by the pawl disengaging spring 38 tends to rock the lever 49 in a clockwise direction. Obviously since such clockwise rocking of the lever 49 is limited by engagement of the curved edge 59 of the lever with the elongated pin 53 such resilient force tends to urge the curved edge 59 firmly into abutting engagement with the elongated pin 53. Because of the overcenter action of the pivot pin 52 when the lever 49 moves from the position shown in FIGURE 4 corresponding to the pawl disengaged position to the position shown in FIGURE 1 corresponding to the pawl gear-engaging position possibility of the pawl roller 34 being disengaged when the propeller shaft is under a load is mitigated. The effective length of the cylindrical members 62 is, as stated hereinbefore, adjustable by relatively rotating the plug 73 and when properly adjusted the pawl roller 34 is in engagement with the cylindrical portion 12 of the drum 11 when the enlarged head 66 of the bolt 63 engages the plate 60 and when the curved edge 59 of the lever 49 is in abutting engagement with the elongated pin 53. When this relationship of the parts exists the yieldable force developed by the compressed pawl disengaging spring 38 acts upon the lever 49 to yieldably maintain the abutting relationship and is of sufficient magnitude to prevent accidental displacement of the lever and thus permit disengagement of the pawl roller 34 with the teeth 35 but which is not as strong so as to require a great deal of effort on the part of the vehicle operator to rock the lever 49 to its unlocked or pawl disengaged position.

It will be appreciated that sliding movement of the cylindrical member 62 with respect to the plate 60 resulting in the enlarged head 66 of the bolt 63 being moved out of engagement with the plate 60 is permitted but such relative movement is resiliently resisted by the bank of springs 71. Consequently the greater relative sliding movement of the cylindrical member 62 toward the plate 60 the greater will be the yieldable force developed by the bank of springs 71. Thus with the effective length of the cylindrical member 62 properly adjusted in the manner pointed out hereinbefore and when the pawl 31 is in its gear-engaging position as shown in FIGURE 1 and the lever 49 is at its extreme limit of clockwise movement, the resilient force developed by the bank of springs 71 is not impressed upon the lever 49 nor the lock pawl 31. However, it is quite possible that with the propeller shaft at rest the shift control lever may be actuated to cause engagement of the pawl roller 34 with the ring-like member 13 even though the pawl roller 34 is not in registration or in a position to mesh with the gear teeth 35 and it may impinge and abut the top or radially outermost surface of one of the teeth 35 of the ring-like member 13 and thereby being prevented from positively locking the propeller shaft. When this occurs it is obvious that the locking pawl 31 is prevented from pivoting to the position shown in FIGURE 2 and the cylindrical member 62 which abuts the wear button 40 is also prevented from moving radially inwardly to its gear-engaging position. However, since the bellcranks 50 and the lever 49 are operatively interconnected in a positive manner the lever 49 and the bellcranks 50 will be moved to the position shown in FIGURE 1 when the gear shift lever is actuated by the vehicle operator to the position corresponding to the gear-engaged position regardless of the fact that the pawl roller 35 is unable to mesh with the teeth 35. It will be obvious that such relative movement between the cylindrical member and the bellcrank 50 is permitted and such relative movement causes the bank of springs 71 to exert a resilient force upon the locking pawl 31 and upon the lever 49 tending to yieldably urge the curved edge 59 thereof into abutting engagement with the elongated pin 53. Hence a slight movement of the vehicle in a forward or rearward direction after the lever 49 has been actuated to its position corresponding to the pawl-engaging position will cause the ring-like member 13 to rotate and the roller 34 to roll on the tooth surface being impinged thereby and the resilient force of the bank of springs 71 acting upon the locking pawl 31 will then immediately move the pawl rollers 34 radially inwardly into positive locking engagement with the ring-like member 13 and will simultaneously compress the pawl disengaging spring 38 as soon as the pawl roller 34 comes into registration with the teeth 35 of the ring-like member 13. By virtue of the lost motion resilient connection between the cylinder member 62 and the bellcranks 50 the vehicle operator is prevented from forcibly jamming the lock pawl roller 34 into mesh with the teeth 35 on the ring-like member 13 until the pawl roller is in registration with the teeth on the ring-like member 13.

Counterclockwise movement of the lever 49 from the position shown in FIGURE 1 by actuation of the shift control lever within the operator's compartment causes the bellcranks 50 to pivot about the pivot pin 55 and permit the pawl disengaging spring 38 to expand and affect movement of the pawl roller 34 to a radial position wherein it is disposed outwardly of a circle containing the radially outermost surfaces of the teeth 35 to unlock or release the propeller shaft. Oftentimes the vehicle may be parked on a hill and heretofore with prior art devices the constant torque on the propeller shaft would cause binding of the engaging parts of the locking pawl and gear teeth with the result that difficulty was experienced in disengagement of the pawl from the gear to unlock the propeller shaft. The pawl roller 34 is in effect an antifriction device interposed between the locking pawl 31 and the ring-like member 13 which has a rolling action with respect to the locking pawl 31 and the teeth 35 of the ring-like member 13 and thus the locking pawl spring 38 may readily disengage the roller 34 from meshing engagement with the teeth 35 of the ring-like member once the lever 49 is swung to move the plug 73 radially away from the ring-like member 13. Furthermore, by inclining the side surfaces 17 of the teeth 35 the torque applied to the propeller shaft tends to move or cam the roller 34 out of engagement with the teeth 35 of the ring-like member 13. Thus, there will be no tendency for the pawl roller 34 to jam in the engaged position once the lever 49 is moved to its unlocked position regardless of the magnitude of torque applied to the propeller shaft. One of the inclined surfaces 17 of the engaged tooth 35 (depending on the direction of rotation of the propeller shaft) acts as a cam surface to induce a disengaging force on the roller 34 which force acts in conjunction with the spring force of the spring 38 to insure complete disengagement of the roller 34 whenever the lever 49 is in an unlocked position.

The embodiment of the invention chosen for the purposes of illustration and description herein, is that preferred for achieving the objects of the invention and developing the utility thereof in a most desirable manner. Due regard being had to existing factors of economy, simplicity of design, and construction and the improvements sought to be effective. It will be appreciated, therefore, that the particular structural and functional aspects emphasized herein are not intended to exclude, but rather to suggest such other adaptations and modifications of the invention as fall within the spirit and scope of the invention as defined in the appended claims.

What is claimed is:

1. In a motor vehicle having a circular member rotatable when the vehicle is in motion, said member having a plurality of circumferentially spaced teeth formed on its outer periphery; a releasable lock device for positively preventing rotation of said member including a pawl having one end pivotally connected to a relatively fixed support adapted to pivot between a normal unlocked position and a locked, tooth-engaging position, means for moving said pawl from said unlocked position to said locked position including a substantially L-shaped bellcrank having an end of one leg thereof pivotally connected to said relatively fixed support for movement between raised and lowered positions, a cylindrical member carried by said bellcrank having one end continually in abutting engagement with said pawl, said cylindrical member being pivotally movable in unison with said bellcrank and capable of relative sliding movement with respect thereto only along its longitudinal axis, said longitudinal axis of said cylindrical member being substantially perpendicular to the rotational axis of said circular member when said bellcrank is in said lowered position; and biasing means yieldably resisting sliding movement of said cylindrical member along its longitudinal axis in one direction.

2. In a motor vehicle substantially as set forth in claim 1, including adjustable means for selectively varying the effective length of said cylindrical member.

3. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support having a roller journalled on one end thereof, said pawl being adapted to pivot between a normal unlocked position wherein said roller is radially spaced outwardly of a circle containing the radially outermost surfaces of said teeth and a locked, tooth-engaging position, means for moving said pawl from said unlocked position to said locked position including a substantially L-shaped bellcrank having an end of one leg thereof pivotally connected to said relatively fixed support for movement between raised and lowered positions, a cylindrical member having one end surface in abutting engagement with said pawl, means operatively connecting the opposite end of said cylindrical member to said bellcrank whereby said cylindrical member is pivotally movable in unison with said bellcrank and is capable of sliding relatively along its longitudinal axis with respect thereto, said longitudinal axis of said cylindrical member being substantially perpendicular to the rotational axis of said circular member when said bellcrank is in said lowered position, said means operatively connecting said cylindrical member and bellcrank including means for limiting sliding movement of said cylindrical member with respect to said bellcrank, and biasing means for yieldably urging said cylindrical member in one direction.

4. In a motor vehicle substantially as set forth in claim 3, including adjustable means for selectively varying the effective length of said cylindrical member.

5. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support having a roller journalled on one end thereof, said pawl being adapted to pivot about an axis spaced from and substantially parallel to the rotational axis of said member between a normal unlocked position wherein said roller is disposed radially outwardly from a circle extending through the radially outermost surfaces of said teeth in a locked, tooth engaging position, the rotational axis of said roller being spaced from and substantially parallel to the pivotal axis of said pawl, means for moving said pawl from said unlocked position to said locked position including a substantially L-shaped bellcrank having an end of one leg thereof pivotally connected to said relatively fixed support for movement between raised and lowered positions, a cylindrical member having one end surface in abutting engagement with said pawl, means operatively connecting the end of said cylindrical member opposite the end surface abutting said pawl to said bellcrank whereby said cylindrical member is pivotally movable in unison with said bellcrank and is capable of sliding with respect thereto along an axis between two fixed limits, said sliding axis being substantially perpendicular to the rotational axis of said circular member when said bellcrank is in said lowered position.

6. In a motor vehicle substantially as set forth in claim 5, including adjustable means for selectively varying the axial spacing of said end surface of said cylindrical member engaging said pawl from said bellcrank when said cylindrical member is at one limit of sliding movement relative to said bellcrank.

7. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support adapted to pivot between a normal unlocked position and a locked, tooth-engaging position, means for moving said pawl from said unlocked position to said locked position including a substantially L-shaped bellcrank having an end of one leg thereof pivotally connected to said relatively fixed support for movement between raised and lowered positions, a cylindrical member having one end surface in abutting engagement with said pawl, means operatively connecting said cylindrical member to said bellcrank whereby said cylindrical member is pivotally movable in unison with said bellcrank, and manually operable linkage means supported on said relatively fixed support operatively connected to said bellcrank for moving said bellcrank between said raised and lowered positions, said linkage means including a lever pivotally connected to said relatively fixed support having a portion thereof movable with respect to said bellcrank and another portion of said linkage means carried by said bellcrank during pivotal movement of said bellcrank, said lever portion and said portion of said linkage means carried by said bellcrank being engageable with each other to limit pivotal movement of said bellcrank in one direction and to thereby establish said lowered position of said bellcrank.

8. In a motor vehicle substantially set forth in claim 7 including yieldable means for resiliently maintaining said lever portion and said portion of said linkage means carried by said bellcrank in engagement with each other when said bellcrank is in said lowered position.

9. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support adapted to pivot between a normal locked position and a locked, tooth-engaging position, biasing means yieldably urging said pawl towards its unlocked position, means for moving said pawl from said unlocked position to said locked position including a substantially L-shaped bellcrank having an end of one leg thereof pivotally connected to said relatively fixed support for movement between raised and lowered positions, a cylindrical member having one end surface in abutting engagement with said pawl, means operatively connecting the end of said cylindrical member opposite the end surface thereof abutting said pawl to said bellcrank whereby said cylindrical member is pivotally movable in unison with said bellcrank, manually operable linkage means supported on said relatively fixed support operatively connected to said bellcrank for moving said bellcrank between said raised and lowered positions, said linkage means including a lever pivotally connected to said relatively fixed support having a portion thereof movable with respect to said bellcrank and another portion of said linkage means carried by said bellcrank during pivotal movement of said bellcrank, said lever portion and said portion of said linkage means carried by said bellcrank being engageable with each other to limit pivotal movement of said bellcrank in one direction and to thereby establish said lowered position of said bellcrank, and yieldable means including said biasing means for resiliently maintaining said lever portion and said portion of said linkage means carried by said bellcrank in engagement with each other when said bellcrank is in said lowered position.

10. In a motor vehicle substantially as set forth in claim 9, including adjustable means for selectively varying the length of said cylindrical member.

11. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support adapted to pivot between a normal unlocked position and a locked tooth-engaging position, means for moving said pawl from said unlocked position to said locked position including a substantially L-shaped bellcrank having an end of one leg thereof pivotally connected to said relatively fixed support for movement between raised and lowered positions, a cylindrical member having one end in abutting engagement with said pawl, means operatively connecting said cylindrical member to the other leg of said bellcrank whereby said cylindrical member is pivotally movable in unison with said bellcrank; and manually operable linkage means operatively connected to said bellcrank for moving said bellcrank between said raised and lowered positions including a lever having one end pivotally connected to said relatively fixed support, link means having one end pivotally connected to said bellcrank at the juncture of the legs thereof, and pivot connection means connecting the opposite end of said link means and a portion of said lever intermediate the ends thereof, an edge portion of said lever adjacent said pivot connection means being engageable with a portion of said linkage means carried by said bellcrank during pivotal movement of said bellcrank to limit pivotal movement of said lever in one direction to thereby establish said lowered position of said bellcrank; and yieldable means for resiliently maintaining said edge portion of said lever into engagement with said linkage portion carried by said bellcrank.

12. In a motor vehicle substantially as set forth in claim 11, including adjustable means for selectively varying the magnitude of the resilient force exerted by said yieldable means maintaining said edge portion of said lever into engagement with said linkage portion carried by said bellcrank.

13. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support adapted to pivot between a normal unlocked position and a locked, tooth-engaging position, biasing means yieldably urging said pawl toward its unlocked position, means for moving said pawl from said unlocked position to said locked position including a substantially L-shaped bellcrank having an end of one leg thereof pivotally connected to said relatively fixed support for movement between raised and lowered positions, a cylindrical member having one end surface in abutting engagement with a portion of said pawl radially spaced from the pivotal axis thereof, means operably connecting the opposite end of said cylindrical member to the other leg of said bellcrank whereby said end surface of said cylindrical member is spaced from said other leg of said bellcrank and said cylindrical member is pivotally movable in unison with said bellcrank, manually operable linkage means operably connected to said bellcrank for moving said bellcrank between said raised and lowered positions, said linkage means including a lever having one end pivotally conected to said relatively fixed support, link means having one end pivotally connected to an intermediate portion of said lever, and pivot connection means carried by said bellcrank pivotally connecting the opposite end of said link means to said bellcrank at the juncture of the legs thereof, an edge portion of said lever being engageable with said pivot connection means to limit pivotal movement of said lever in one direction to thereby establish said lowered position of said bellcrank; and yieldable means including said biasing means for resiliently maintaining said edge portion of said lever into engagement with said pivot connection means.

14. In a motor vehicle substantially as set forth in claim 13, including manually adjustable means for selectively varying the spacing between said other leg of said bellcrank and said end surface of said cylindrical member in abutting engagement with said portion of said pawl.

15. In a motor vehicle having a circular member rotatable when the vehicle is in motion, said member having a plurality of circumferentially spaced teeth formed on its outer periphery; a releasable lock device for positively preventing rotation of said member including a pawl pivotally mounted on a relatively fixed support adapted to pivot between a normal unlocked position and a locked, tooth-engaging position, biasing means yieldably urging said pawl toward its unlocked postion, means for moving said pawl from said unlocked position to said locked position including a substantially L-shaped bellcrank having an end of one leg thereof pivotally connected to said relatively fixed support for movement between raised and lowered positions corresponding to the unlocked and locked positions, respectively, of the pawl, a cylindrical member having one end in abutting engagement with said pawl, means operatively connecting said cylindrical member to said bellcrank whereby said cylindrical member is pivotally movable in unison with said bellcrank, manually operable linkage means operatively connected to said bellcrank for moving said bellcrank between said raised and lowered positions, said linkage means icluding a lever having one end pivotally connected to said relatively fixed support for pivotal movement about an axis spaced and parallel to the pivotal axis of said bellcrank, link means, first pivot connection means carried by said bellcrank pivotally connecting one end of said link means to the juncture of the legs of said bellcrank, second pivot connection means pivotally connecting the opposite end of said link means to a portion of said lever intermediate the ends thereof, said second pivotal connection means passing through a plane containing the pivotal axis of said lever and the longitudinal axis of said first pivot connection means as said bellcrank moves between its raised and lowered positions, an edge portion of said lever adjacent said second pivotal connection means engaging said first pivotal connection means to limit pivotal movement of said lever in one direction to thereby establish said lowered position of said bellcrank; and yieldable means for resiliently maintaining said edge portion of said lever in engagement with said first pivotal connection means including said bias means.

16. In a motor vehicle having a ring-like member rotatable when the vehicle is in motion, said member having a plurality of circumferentially spaced teeth formed on its outer periphery; a releasable lock device for positively preventing rotation of said ring-like member including a pawl pivotally mounted on a relatively fixed support adapted to pivot between a normal unlocked position and a locked tooth-engaging position, spring means for yieldably urging said pawl toward its unlocked position, means for moving said pawl from said unlocked position to said locked position including a substantially L-shaped bellcrank having an end of one leg pivotally connected to said relatively fixed support for pivotal movement between raised and lowered positions corresponding to the unlocked and locked positions, respectively, of said pawl, a substantially flat plate rigidly connected to said bellcrank, a cylindrical member having one end surface in abutting engagement with said pawl, means operatively connecting said cylindrical member to said plate whereby said cylindrical member is pivotally movable in unison with said bellcrank and slidable relatively toward and away from said plate along an axis perpendicular to said plate, stop means carried by said cylindrical member and engageable with said plate for limiting sliding movement of said cylindrical member away from said plate, resilient means yieldably urging said stop means into engagement with said plate, and adjustable means for varying the spacing along the sliding axis of said cylindrical member between the end surface of said cylindrical member engaging said pawl and said plate when said stop means is in engagement with said plate.

17. In a motor vehicle having a ring-like member rotatable when the vehicle is in motion, said member having a plurality of circumferentially spaced teeth formed on its outer periphery; a releasable lock device for positively preventing rotation of said ring-like member including a pawl pivotally mounted on a relatively fixed support having a roller journalled on one end thereof, said pawl being adapted to pivot between a normal unlocked position wherein said roller is radially spaced outwardly of a circle containing the radially outermost surfaces of said teeth and a locked, tooth-engaging position, spring means for yieldably urging said pawl toward its unlocked position, means for moving said pawl from said unlocked position to said locked position including a substantially L-shaped bellcrank having an end of one leg pivotally connected to said relatively fixed support for pivotal movement between raised and lowered positions about an axis radially spaced from the axis of rotation of said ring-like member and lying in a plane perpendicular to the rotational axis of said ring-like member, said raised and lowered positions of said bellcrank corresponding to the unlocked and locked positions, respectively, of said pawl, a substantially flat plate rigidly connected to said bellcrank, a cylindrical member having one end surface in abutting engagement with said pawl at a point radially spaced from the pivotal axis of said pawl, means operatively connecting said cylindrical member to said plate whereby said cylindrical member is pivotally movable in unison with said bellcrank and slidable relatively toward and away from said plate along an axis perpendicular to said plate, stop means carried by said cylindrical member and engageable with said plate for limiting sliding movement of said cylindrical member away from said plate, resilient means yieldably urging said stop means into engagement with said plate, and adjustable means for varying the spacing along the sliding axis of said cylindrical member between the end surface of said cylindrical member engaging said pawl and said plate when said stop means is in engagement with said plate.

18. In a motor vehicle substantially as set forth in claim 17, including manually operable linkage means operatively connected to said bellcrank for moving said bellcrank between said raised and lowered positions, said linkage means including a lever having one end pivotally connected to said relatively fixed support for pivotal movement about an axis spaced and parallel to the pivotal axis of said bellcrank, link means, first pivot connection means carried by said bellcrank pivotally connecting one end of said link means to the juncture of the legs of said bellcrank, second pivot connection means pivotally connecting the opposite end of said link means to a portion of said lever intermediate the ends thereof, said second pivotal connection means passing through a plane containing the pivotal axis of said lever and the longitudinal axis of said first pivot connection means as said bellcrank moves between its raised and lowered positions, an edge portion of said lever adjacent said second pivotal connection means engaging said first pivotal connection means to limit pivotal movement of said lever in one direction to thereby establish said lowered position of said bellcrank; and yieldable means for resiliently maintaining said edge portion of said lever in engagement with said first pivotal connection means including said spring means.

References Cited in the file of this patent

UNITED STATES PATENTS

| | | |
|---|---|---|
| 1,154,041 | Morgan | Sept. 15, 1915 |
| 1,365,841 | Mellenthin | Jan. 18, 1921 |
| 2,709,504 | Mamo | May 31, 1955 |
| 2,966,244 | Schreyer | Dec. 27, 1960 |
| 2,974,752 | Howard | Mar. 14, 1961 |
| 2,995,958 | Jungeling et al. | Aug. 15, 1961 |